INVENTOR.
HARVEY BURR
BY U. F. Volk
HIS AGENT

Feb. 20, 1968 H. BURR 3,369,355

STRANDING APPARATUS AND METHOD AND CABLE MADE THEREBY

Filed June 13, 1966 7 Sheets-Sheet 2

INVENTOR.
HARVEY BURR
BY V. F. Volk
HIS AGENT

STRANDING APPARATUS AND METHOD AND CABLE MADE THEREBY

Filed June 13, 1966 7 Sheets-Sheet 3

INVENTOR.
HARVEY BURR
BY V. F. Volk
HIS AGENT

INVENTOR.
HARVEY BURR

BY V F Volk

HIS AGENT

INVENTOR.
HARVEY BURR

BY V.F. Volk

HIS AGENT

STRANDING APPARATUS AND METHOD AND CABLE MADE THEREBY

INVENTOR.
HARVEY BURR
BY V. F. Volk
HIS AGENT

STRANDING APPARATUS AND METHOD AND CABLE MADE THEREBY

Filed June 13, 1966 7 Sheets-Sheet 7

INVENTOR.
HARVEY BURR
BY V. F. Volk
HIS AGENT

United States Patent Office 3,369,355

Patented Feb. 20, 1968

3,369,355

STRANDING APPARATUS AND METHOD AND CABLE MADE THEREBY

Harvey Burr, Bronxville, N.Y., assignor to Anaconda Wire and Cable Company, a corporation of Delaware Filed June 13, 1966, Ser. No. 557,087
18 Claims. (Cl. 57—34)

My invention relates to apparatus and method for stranding together a plurality of filamentary members particularly where such stranding is of a reversing and/or reentry type.

The present discussion is directed toward the manufacture of telephone cables where each of the strands is an insulated pair or quad but it will be understood that my invention will also have application to the manufacture of other types of stranded product. In the manufacture of telephone cables it is customary to combine a large plurality, such as 25, of pairs into a core by paying the individual pairs from their individual reels into a stranding machine in which there is mounted a large take-up reel. To provide a helical twist to the strands either the take-up reel is rotated end-over-end or a loop of the strands is continually rotated by a frame around the take-up reel. Both methods of stranding are known and both have the disadvantage that they are not adaptable to a continuous manufacturing operation being of the nature of a batch operation insofar as a full reel of stranded cable constitutes a batch. The known apparatus has the further disadvantage that it is very costly and slow due to the requirement for large rotating masses. There is a further disadvantage that the relative position of each strand in the cable remains fixed with the result that the strands have different capacitances to the cable shield.

Cables made with my apparatus or by my method have the advantage of a reversing lay so that it is easy to slacken a strand for the purpose of introducing a splice.

My apparatus has the advantage that it is free from large rotating masses and can thus operate at higher speeds.

Each strand in cables made with certain embodiments of my apparatus will occupy the same positions in the cross-section as every other strand, with the result that the electrical properties are uniform.

Adjacent rows of strands of my cable have opposing directions of twist and are therefore less liable to cross talk.

My stranding apparatus comprises means paying off a plurality of strands, means advancing the strands and means comprising a path in the form of a figure-8 transverse to the advance of said strands. There are means continuously urging the strands to move consecutively around the path and, in a preferred embodiment, the total length of the path is at least twice the length of the path occupied at some instant by the strands moving around said path. Means downstream of the path gather the strands to form a cable and means also downstream of the path bind the strands.

In some embodiments my appartus comprises a sprocket having internal teeth and an endless chain comprising a plurality of spaced strand-guiding means fitting the teeth. A first member in the form of an open ring comprising an outer periphery forming the arc of a circle, an inner periphery, and an entrance portion, is fitted within the sprocket and retains the links on the teeth. The chain is of a length matching the combined inner and outer periphery of this member and is fitted around this periphery. A second member fits the inner periphery and entrance portion closely and retains the links against the first member. There are means rotatably driving the second member thereby advancing the chain around the inner and outer periphery of the first member. Preferably these means drive this member uniformly in one direction and there are means rotatably driving the sprocket opposite to the direction of rotation of the second member. Preferably, also, my apparatus comprises a member with an inner periphery comprising an irregular shape, thereby increasing the length of chain fitted around it.

Other embodiments of my invention comprise a means paying off a plurality of strands, a chain comprising a plurality of strand guides, means continuously advancing the strands through the guides and a track in the form of a figure-8 or crossing double-loop transverse to the advance of the strands. There are means continuously urging the chain around the track, means downstream of the track gathering the strands to form a cable and other means downstream, binding the strands. The length of the track is at least twice the length of the chain and in a preferred embodiment the loops are curved back toward the plane of the center of the figure-8.

I have invented appartus advancing a plurality of strand guides in a path comprising a crossing double-loop comprising a plate, and a wall defining two apertures in the plate connected by a narrow channel. The wall is straight in the proximity of the channel and there is a chain comprising the strand guides that comprises a plurality of connected links. There is also a track around the wall and the links have first track engaging means on one side of the chain and second track engaging means on the opposite side of the chain. At least the first link of the chain has a length greater than the width of the channel. The first track-engaging means of the first link engages the track on one side of the channel and the second track-engaging means of the first link simultaneously engages the track on the other side of the channel whereby the chain is directed around the track on a crossing double-loop across the channel.

Still other embodiments of my invention comprise a supporting plate, two substantially tangent discs rotatably mounted in the plane of the plate, a plurality of guide means on the discs for strands passing through the plate, means rotating the discs in opposite directions and means consecutively transferring the strands from one to the other of the discs in the area of tangency of the discs whereby each of the strands is caused to follow a figure-8 path in the plane of the plate.

I have invented the method of stranding a reentrant cable with reversing lay comprising paying a plurality of strands from individual stations spaced substantially apart, converging the strands through a central location and thence directly passing each strand through one of a plurality of guides. Simultaneously I advance the guides consecutively through a figure-8 path transverse to the advance of the strands thence directly converge the strands through a forming die and bind them. The strands are positioned so as to leave a continuous length of the path, equal to at least half the total length of the path free from strands.

I have also invented a new telephone cable comprising a plurality of pairs any cross section of which has the pairs arranged in a continuous line formed by compressing a fractional length of a crossing double loop. Lengthwise of the cable each of the pairs progresses continuously along the double loop and each of the pairs in an indefinitely long length of my cable has as much of its pair length in any cross-sectional area of the cable as any other of said pairs.

A more thorough understanding of my invention may be gained from the appended drawing.

Figure 8:
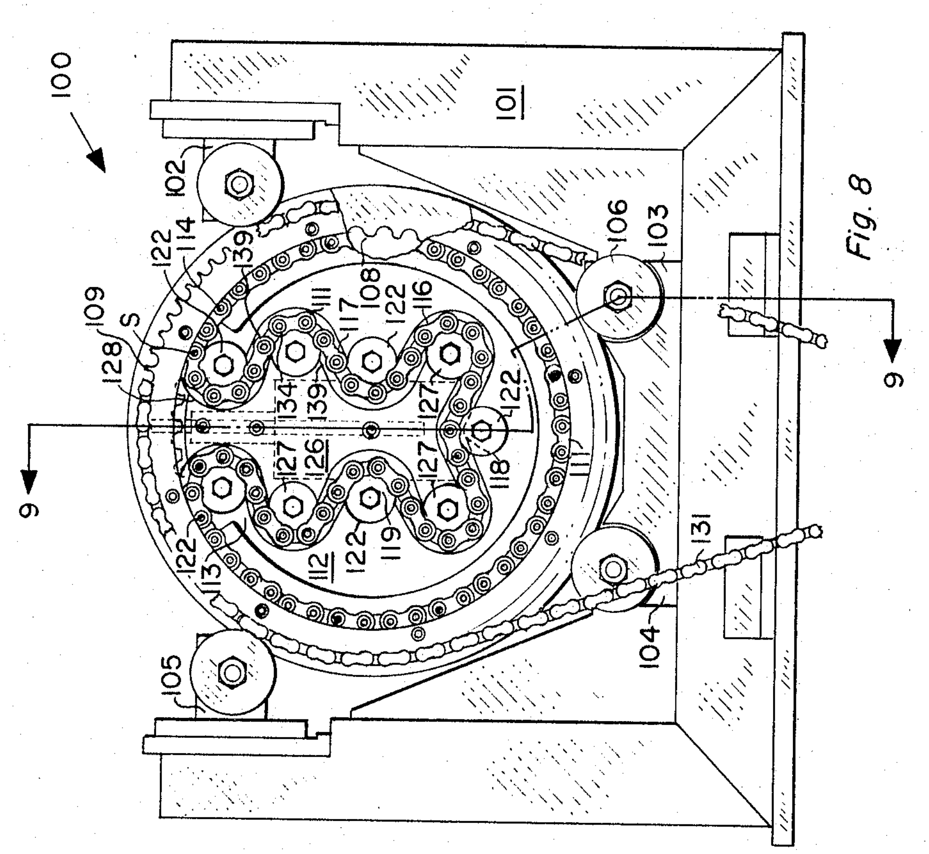
FIGURE 8 shows a view from upstream of an apparatus of my invention.
Figure 11:
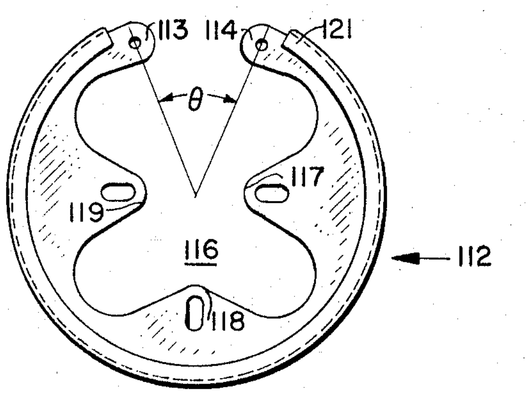
FIGURE 11 shows a front view of the element 112 of FIGURE 8.
Figure 12:
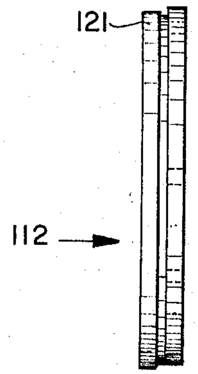
FIGURE 12 shows a side view, partly in section of the element of FIGURE 11.
Figure 13:
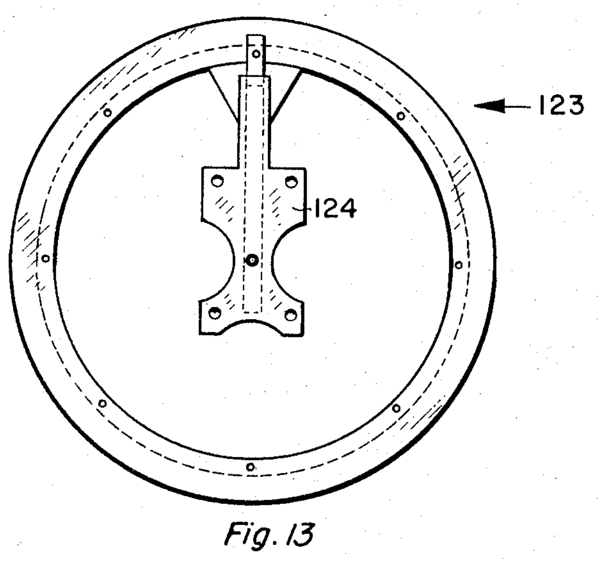
FIGURE 13 shows a front view of the element 123 of FIGURE 8.
Figure 14:
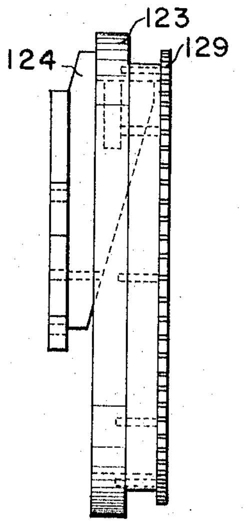
FIGURE 14 shows a side view of the element of FIGURE 13 plus the sprocket 129.
Figure 15A:
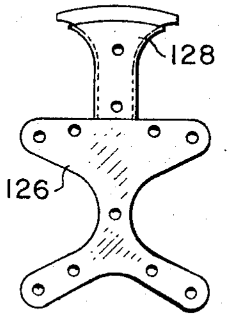
Figure 15B:
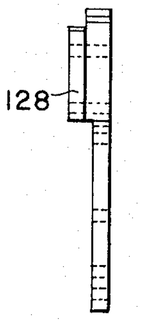

FIGURES 15*a* and *b* show a front and side view respectively of the element 121 of FIGURE 8.

Figures 16, 20:
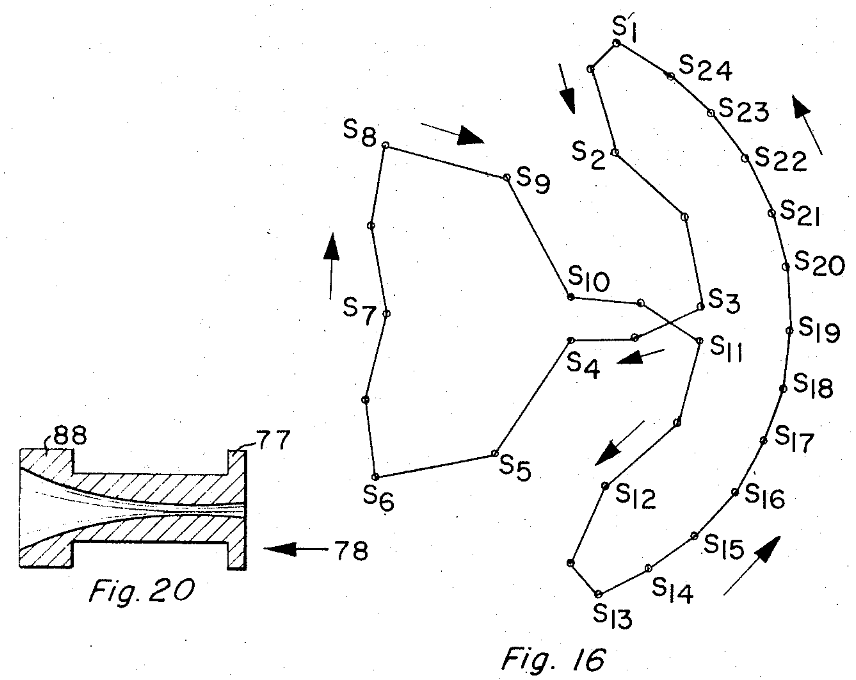

FIGURE 16 shows the path followed by a strand in the apparatus of FIGURE 8.

Figure 1:
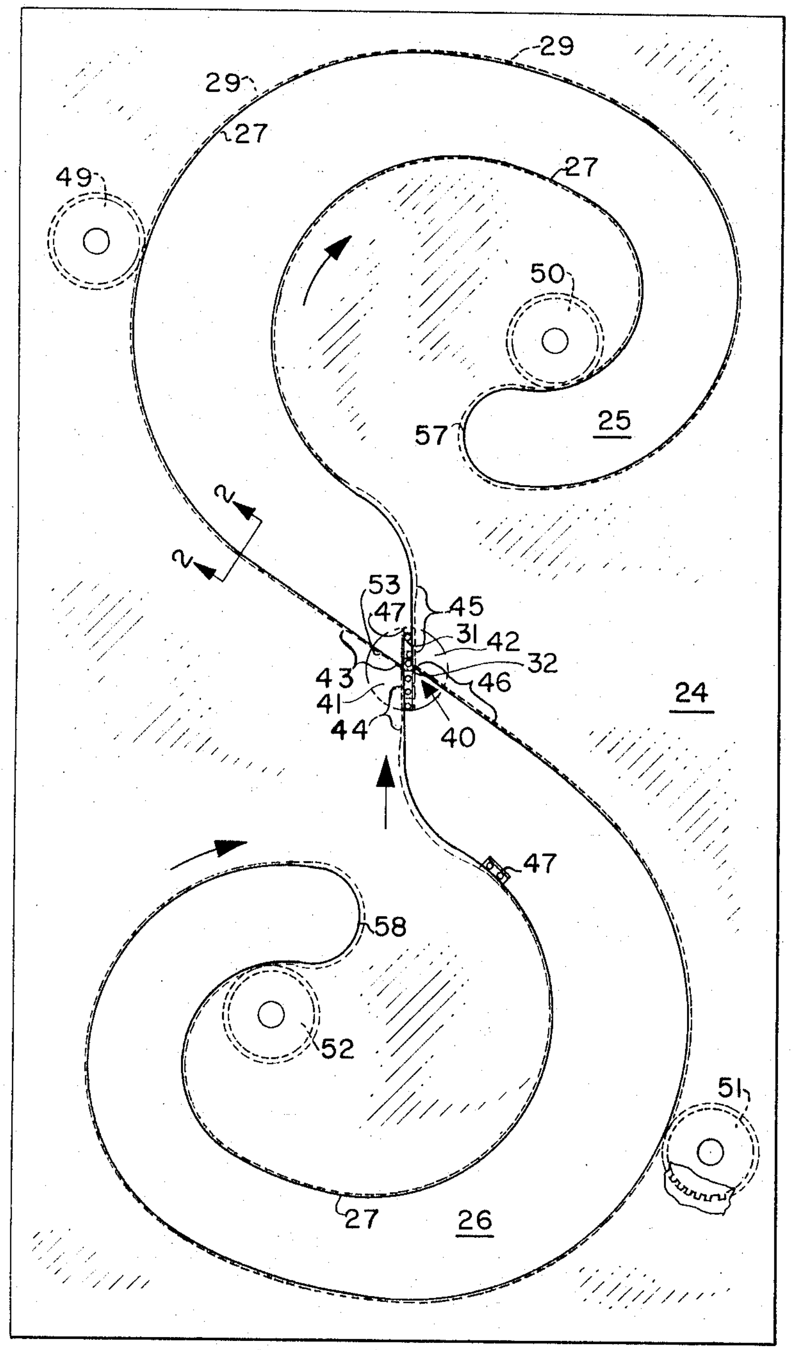
FIGURE 1 shows a view from upstream of a stranding element of my invention.
Figure 17:
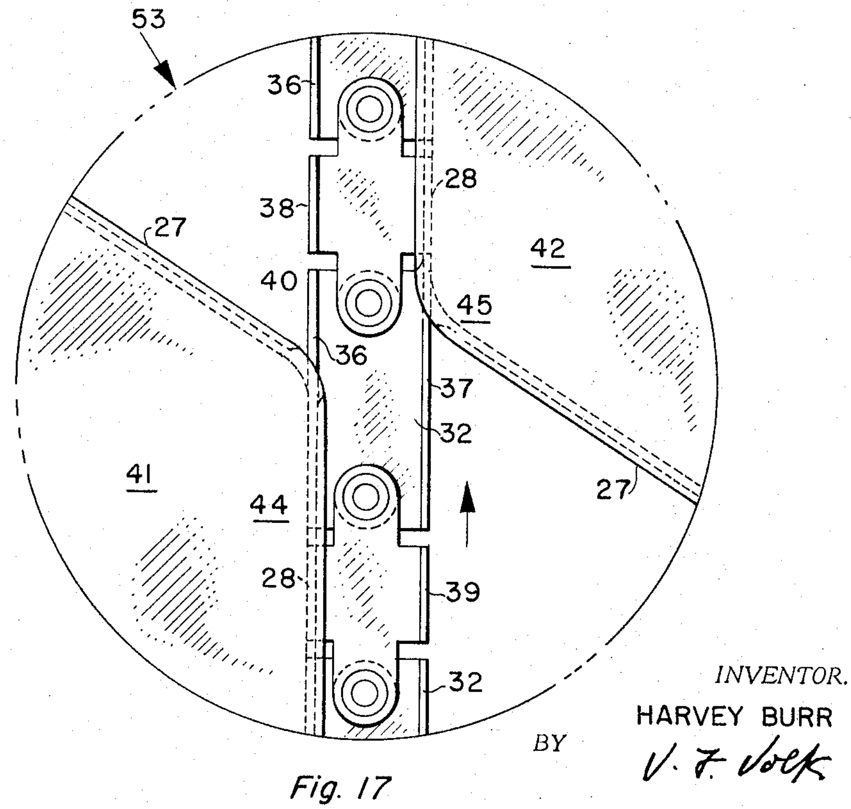

FIGURE 17 shows an enlarged view of the cross-over area of FIGURE 1.

Figure 18:
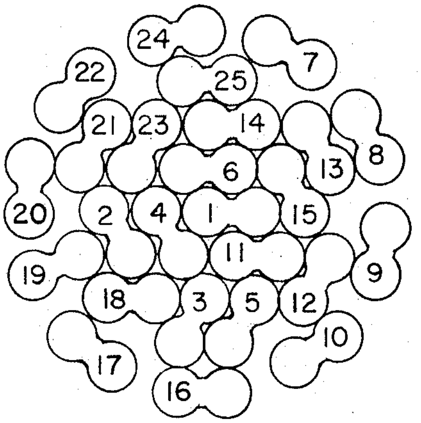
Figure 19:
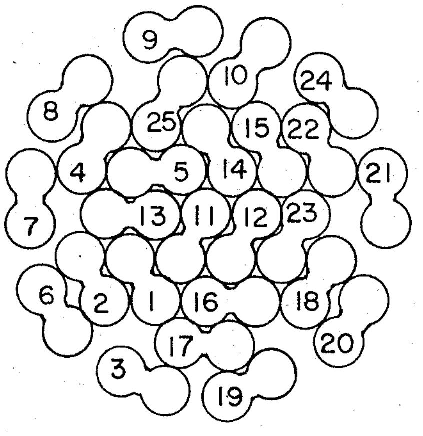
Figure 7:
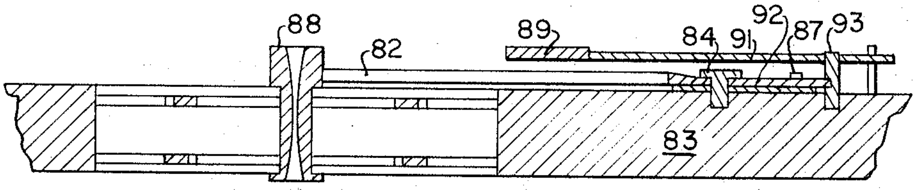
FIGURE 7 shows a section through the line 7—7 of FIGURE 5.
Figure 9:
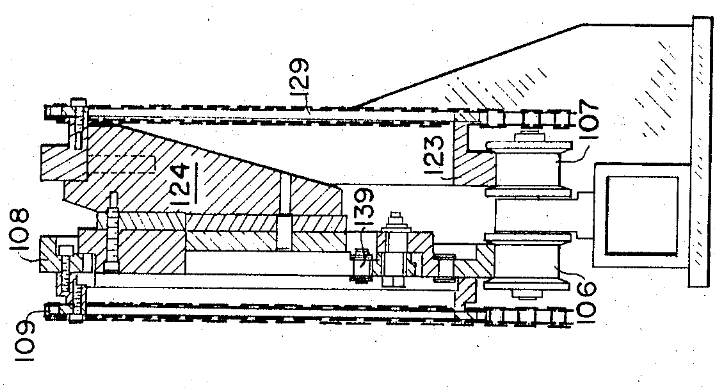
FIGURE 9 shows a section through the line 9—9 of the apparatus of FIGURE 8.

FIGURES 18 and 19 show two sections progressing along a length of the cable of my invention.

FIGURE 20 shows a longitudinal section of a guide used in my apparatus.

The stranding apparatus indicated generally by the numeral 10 (FIGURE 4) comprises a rack 11 wherein are rotatably mounted a plurality of pay-off reels 12—12 of strands 13—13 which, in the illustrated embodiment, are comprised of twisted pairs of insulated telephone conductors. It will be understood, however, that my apparatus is useful for stranding single insulated conductors and other filamentary materials. The strands 13—13 are gathered into a die 14 mounted on an upright 16 and, passing through the die 14, are advanced by a caterpillar capstan 17 through a stranding element indicated generally by the numeral 18, a forming die 19 which compacts the strands into a cable or cable unit 21, and a binding head 22 which wraps a tape 23 around the cable 21 in a continuous open helix. Although I have illustrated the strands 13—13 being advanced by the capstan 17 it will be understood that other means of advancing the strands, which are known, can be employed within the scope of my invention. Particularly the cable 21 may pass directly through an additional manufacturing operation, such as a jacket extrusion operation or an additional cabling operation. Indeed the advantage of my apparatus is greatly enhanced by the fact that my stranding operation does not interrupt the continuous processing of strands through subsequent manufacturing steps. It is also true that my cabling operation allows continuous operation through processing steps upstream of my stranding apparatus. I have shown each of the strands 13—13 being paid from reels on the rack 11 but my stranding apparatus will work well if the rack 11 merely mounts guides or pulleys and the strands are advanced through them from some upstream operation such as twisting the pairs, or insulating the individual conductors.

Figure 2:
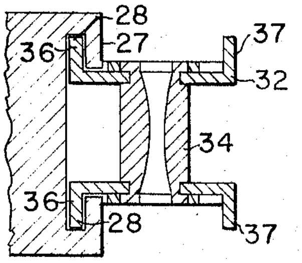
FIGURE 2 shows a section 2—2 through the element of FIGURE 1.
Figure 3:
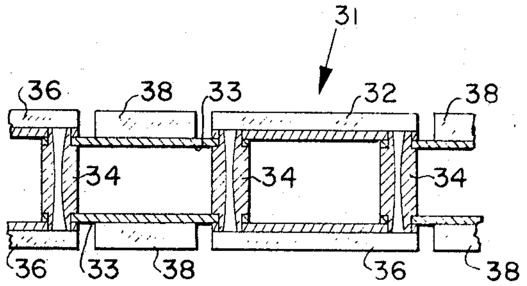
FIGURE 3 shows an enlarged view of a section of the chain of FIGURE 1.
Figure 10:
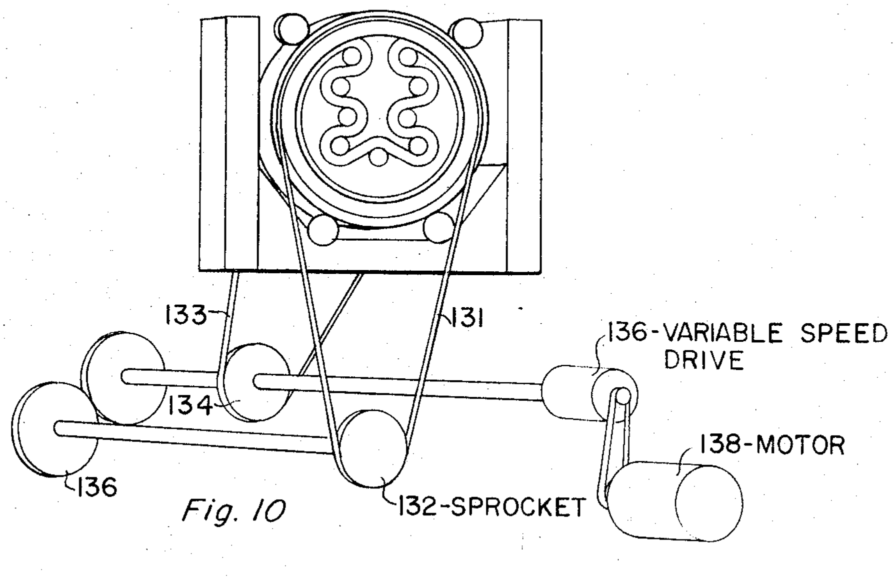
FIGURE 10 shows a diagrammatic representation of the apparatus of FIGURE 8 and associated driving means.

The stranding element 18 comprises a plate 24 (FIGURE 1) having apertures 25, 26 defined by a wall 27—27. The wall 27 outlining the apertures 25, 26 is cut with a double groove 28—28 (FIGURE 2) which constitutes a track 29 for a chain 31. The track 29 actually causes the chain to follow a crossing double loop or figure-8 path in which the loops of the figure-8 are elongated and curved back toward the center of the figure-8 thus creating the appearance of an S shown in FIGURE 1. The chain 31 is made up of a plurality of links 32 connected by plate members 33—33 that are secured by hollow pins 34—34 forming elements of the links 32. Although, for the sake of simplicity I have shown the grooves 28 cut into the wall 27, persons skilled in machining will recognize that the track 29 might be more economically formed by fastening L-shaped members to the wall face.

The links 32 have two double flanges 36—36, 37—37 that fit into the grooves 28 and lock into the grooves so that the chain 31 follows the track 29. Similarly the plate members 33 have projections 38, 39 (see also FIGURE 17) fitting the grooves 28. The two apertures 25, 26 are connected by a channel 40 between opposing angles 41, 42 projecting toward each other in the plate 24. The angle 41 is formed by straight wall sections 43, 44 of the wall 27 and the angle 42 is formed by straight wall sections 45, 46 of the wall 47. These wall sections are so formed that the section 45 has the same direction as the section 44 but is offset a distance equal, at least, to the diameter of the pins 34. Similarly the wall section 46 continues the direction of the section 43 but is also offset a distance at least sufficient to allow the passage of the pins 34. The grooves 28 in the wall sections 44, 45, 43, 46 are parallel to the wall at the sections and the distances are so established that the groove 28 in the wall 45 is offset from the groove 28 in the wall 44 a distance equal to the distance between the flanges 36 and the flanges 37. The same is true of the relation between the grooves 28 in the sections 42 and 43. As can best be seen in FIGURE 17, a link 32 advancing up the track 29 by reason of having its flanges 36 held in the grooves 28 of the section 44 will have its flanges 37 automatically directed to engage the grooves 28 of the section 45, since the length of the link 32 is greater than the size of the channel 40. In this regard it should be noted that although I prefer to have all my links 32 longer than the width of the channel, an operable embodiment might have only the first link in the chain 31 of such a length and rely on the other links following in line. To reduce the chance of jamming the links in crossing the channel 40 the grooves 28 are funnel-shaped at the entrance to the sections 45 and 46 as shown in FIGURE 17.

Four sprockets 49, 50, 51, 52 driven by a series of chains and idler gears and a motor, not shown, but in a manner known to persons skilled in mechanics, drive the chain 31 by the action of the sprocket teeth on the pins 32. At an area 53 of the plate 24 the path of the chain 31 has its cross-over point but it is necessary to provide a continuous opening through the plate 24 for the passage of the strands 13 each of which passes through one of the pins 34 which thus serve as strand guides. For this purpose the apertures 25, 26 are narrowed in the area 53 to a width slightly greater than the diameter of the guides 34 but less than the length of the links 32 so that the links will bridge the channel 40 when they follow in a straight line across the channel. For this purpose the wall 27 and grooves 28—28 follow a straight line path in the lengths 43 and 44 and the groove 28 narrows where it approaches the channel 40 so that the links are directed in a straight line. On the other hand, where the track 29 is curved as at the areas 57, 58 the groove 28 is widened so that the chain 31 can follow the bend. When the chain 31 approaches the channel in the area 53 the links 32 cross the channel.

Each of the advancing strands 13 passes through one of the hollow pins 34 which thus comprise moving guides for the strands. In this manner the chain 31 bearing the advancing strands 13 follows around the wall 27 in a figure-8 or crossing double loop path. The length of the chain 31 is no greater than half the length of the track 29 so that the chain is not required to cross itself in the area 53 and the path of the strands 13 is never obstructed by the links of the chain.

It will be observed by studying FIGURE 1 that a strand moving around the upper half 25 of the double loop has an overall clockwise motion while the same strand, when it is in the lower half 26 of the double loop has an overall counterclockwise motion. As the strands 13 are twisted in a clockwise direction around the aperture 25, this twist is necessarily imparted to the length of the strands approaching the plate 24 from the guide die 14 and if the clockwise motion were to continue for a few complete turns the strands would be so intertwined that they could no longer be advanced through the pin guides 34. In my apparatus, however, no sooner is one full back twist imparted to its strands in a clockwise direction than the first link of the chain 31 passes across the channel 40 and the chain begins a counterclockwise rotation around the aperture 26 which unwinds the back twist. Moreover since the chain 31 advances continually around the track each strand guide and each strand passes through every point of the track, including the center. As the strands leave the station 18 they are immediately gathered by the forming die 19 into a cable, where their relative positions are fixed.

It has been suggested to form a reverse lay cable by merely passing strands through holes in a lay plate that is made to oscillate around its center. It will be seen that the cable made by such an apparatus will differ greatly from a cable made on my present apparatus since, with the oscillating plate, the distance of each strand from the outer surface of the cable will not change, and the individual strands will always have the same relative positions to each other. To show that this is not true in my apparatus let use consider the instant when the chain is all confined to the upper loop 25.

I have stated that the chain 31 is less than half the length of the tract 29. There is no lower limit to the length of the chain 31 so long as some portion of it is always in contact with a driving sprocket such as the sprockets 49–52. However, I prefer to employ a chain long enough to fill the track 29 around one loop of the loops 25, 26, since it is not necessary that each of the pin guides 34 should have a strand passing through it. Under these circumstances when the chain is in the upper track the first link and the last link of the chain will then be close together near the area 53 and so will be the strands carried by the guides 34 of those links. As the chain advances, however, the first and last strands become widely separated, the first strand approaching the area of the sprocket 51 and the last strand approaching the area of the sprocket 50.

Figure 5:
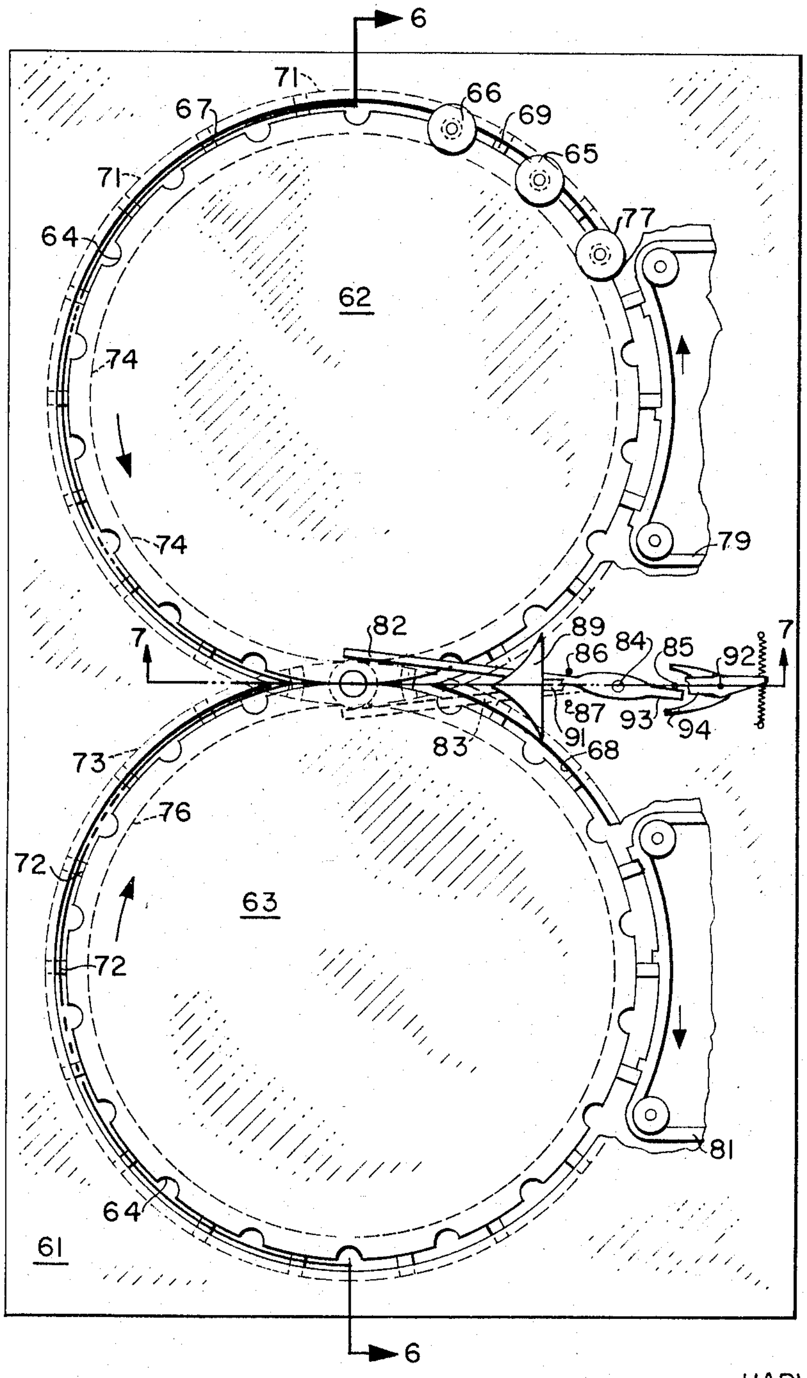
FIGURE 5 shows a view from upstream of another embodiment of the stranding element of my invention.

In FIGURE 5 I show an embodiment of the stranding element 18 where the strands are carried around a perfect figure-8 path without the use of a chain. Here a plate 61 corresponding to the plate 24 supports two discs 62, 63 having semicircular circumferential notches 64—64 holding strand guides 66 against two circular walls 67, 68 cut in the plate 61.

The upper disc 62 has teeth 69 alternating between the notches 64 that hold the disc within the circular wall 67 by riding in a groove 71 cut in that wall. Similarly the disc 63 has teeth 72 which ride in a groove 73 in the wall 68. The teeth 69 and groove 71 are in a different plane from the teeth 72 and groove 73 and there is a circumferential groove 74 cut in the disc 62 in the plane of the teeth 72 and a circumferential groove 76 cut in the disc 63 in the plane of the teeth 69 so that the two discs can be mounted tangentially, or nearly so without interfering.

The guides 66 are slightly longer than the thickness of the discs 62, 63 and plate 61 and are prevented from moving in a lengthwise direction by flanges 77. The plurality of guides 66 does not exceed the number of grooves 64 in either of the discs 62, 63 so that they can all be contained on one disc. By this means there is avoided any entanglement of the strands entering the element 18. As shown in FIGURE 5 the disc 62 is being turned counterclockwise by a timing belt 79 engaging the radial ends of the teeth 69 and the disc 63 is turned clockwise by a timing belt 81 engaging the radial ends of the teeth 72. The belts 79, 81 are mounted in a known manner and driven by means not shown of which several types are well known.

The turning of the discs 62, 63 is synchronized so that the notches 64 of each disc are opposed at the point of tangency. Thus when the guides 66, in being carried by the disc 62, reach the lowest point of that disc, they enter the corresponding notch of the disc 63 and are transferred to the lower disc 63 by means of a finger 82 mounted on the projecting point 83 of the plate 61 between the two discs. The finger 82 is held to the plate 61 by a pin 84 that permits the finger to turn until it is restrained by blocking pins 86, 87. A compressible button 85 retains the finger 82 in the upper or lower position until it is urged to change positions by means hereinafter to be shown. All the guides on the disc 62 are thus transferred to the disc 63 but a last of these guides 78 has a flange 88 that is much thicker than the flanges 77 (see FIGURE 20).

As this guide 78 advances around the disc 62 the enlarged flange 88 engages a cam member 89 rigidly connected by means of an arm 91 to a post 92 turnably mounted behind an extension 93 of the finger 82 on the opposite side of the pin 84. A forked member 94 is rigidly attached to the post 92 and extends on either side of the extension 93, with the result that when the arm 91 is pivoted in one direction, the finger 82 is pivoted in the opposite direction. Thus when the extended flange of the last guide on the disc 62 urges the cam 89 and arm 91 upwardly (toward the disc 62) the finger 82 moves downwardly (toward the disc 63) until it rests against the blocking pin 87. When the first guide 66 on the disc 63 reaches the top it is urged by the finger 82, now in its lowered position, to remain in the notch of the disc 62 and this is true of the remaining guides 66 the last of which again reverses the position of the finger 82. It will be seen that all the notches of either one of the discs do not have to be occupied by a guide in order for my apparatus to carry the guides, and thus the strands, through a figure-8 path. So long as the last guide has an extended flange to engage the cam 89 my apparatus will function in the desired manner.

FIGURES 8–15 describe an embodiment of a reverse lay strander unit indicated generally by the numeral 100 that has proven capable of operating at high speeds without entangling the strands. Here a frame 101 mounts four bearings 102, 103, 104, 105, each supporting a pair of rollers 106, 107. The forward (upstream) rollers 106 rotatably support an internal sprocket 108 to which is bolted a drive sprocket 109. Fitted within the internal sprocket and sufficiently spaced therefrom to receive an endless link chain 111 is a floating plate 112 having a circular outer periphery terminating in two horns 113, 114 marking the entrance of an irregular opening 116 with inward projections 117, 118, 119. The plate 112 has an offset flange 121 forming an open circle with a diameter somewhat greater than the remainder of the plate and extending short of the projecting horns 113, 114. At the horns 113, 114 and each of the projections 117, 118, 119 there is mounted a roller 122 in the plane of the flange 121, with the result that flange 121 fits against the chain 111 and holds the chain against the teeth of the sprocket 108, while an excess length of the chain fits over the rollers 122 fixed to the horns 113, 114 and follows the contour of the opening 116 supported by these rollers 122.

The rear rollers 107 rotatably support a ring 123 to which is welded a bracket 124 for a plate 126 that fits within the opening 116. The shape of the plate 126 matches the irregular shape of the opening and the plate 126 has mounted upon it four rollers 127 in the plane of the rollers 122 and alternating with these rollers so as to provide a continuous circuitous path for the chain 111. An upper projection 128 of the plate 126 is recessed to fit the horns 113, 114 and to guide the chain 116 around the horns.

A sprocket 129 is bolted to the ring 123. By means of the sprockets 129 and 109 the internal sprocket 108 and the plate 126 can be independently driven. It is preferred, however, to drive the two sprockets at a fixed but alterable ratio, and this is done (FIGURE 10) by means of a chain 131 driving the sprocket 109 from sprocket 132, and a chain 133 driving the sprocket 129 from sprocket 134. The sprockets 132, and 134 are turned in opposite directions by means of ratio gears 136, the whole being driven by a variable speed drive 137 combined with a motor 138.

Figure 4:
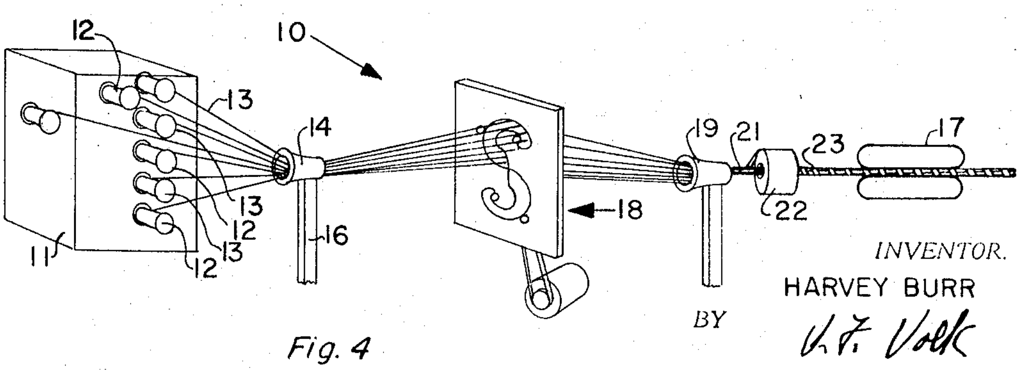
FIGURE 4 shows a diagrammatic side view of my apparatus and illustrates the process of my invention.
Figure 6:
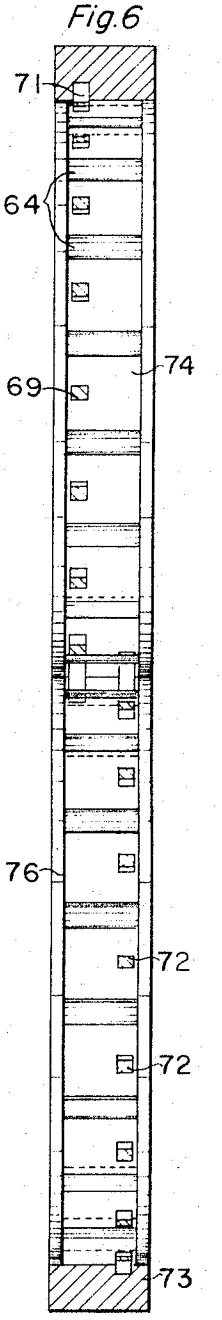
FIGURE 6 shows a section through the line 6—6 of FIGURE 5.

Pins 139—139 of the chain 111 are hollow and constitute guides for the strands 13 which are passed through the pin guides 139 from the central location provided by the die 14 (FIGURE 4). Stranding of the strands is accomplished by the rotation of the plate 126 as a result of the effect of the rotation of the sprocket 129. When the plate 126 is rotated in a clockwise direction, the extension 128 is urged against the horn 114 and pushes the plate 112 around with it. If, while the plates 126 and 112 were rotating clockwise the internal sprocket 108 should remain stationary the portion of the chain 111 around the periphery of the plate 112 would also remain stationary since the links are locked to the teeth of the internal sprocket, but each link in turn would leave the periphery, move around the horn 114, follow the contour of the plate 126, and return to a position on one of the teeth of the sprocket 108 after rounding the horn 113. The new position of each link after leaving the horn 113 would be in clockwise advance of its old position, so that the net effect would be to move each of the strands in and out of the center portion of the cable being formed but at the same time advance the strands in a progressive helix which would soon lock them in a twisted condition upstream of the stranding unit. To unwind the upstream twist or, more properly, to prevent the occurrence of an upstream twist a counterclockwise rotation is given to the internal sprocket 108 by turning the sprocket 109. The ratio of the speed of the two sprockets 109 and 129 is dependent on the ratio of the length of the chain 111 to the pitch circumference of the internal sprocket 108, which ratio I shall call $n$, and the angular separation of the horns 113, 114.

It is desirable to have $n$ as large as possible and I have accomplished this by the irregular shape of my plates 112 and 126. It is further desirable to have $\theta$, which is the angular horn separation, as small as possible but I have found it mechanically infeasible to reduce $\theta$ substantially below 45°. The ratio of rotational speeds of the sprocket 109 to the sprocket 129 should be $1/n-1$. This can be achieved in a known manner by a proper selection of the number of teeth in the sprocket 109, 129, 132, 134 and the ratio gears 136 which, although I have shown them to be equal, might, within the scope of my invention be of different sizes, in order to achieve a proper angular speed for the sprockets 109, 129.

FIGURE 16 shows the pattern followed by one of the strands 13 passing through the particular guide 139 marked $s$ in FIGURE 8. This particular strand will reach the points $s_1$, $s_2$ . . . , $s_{24}$ in equal intervals of time, so that in a long distance of cable the strand will have about half its length in the right hand outside arc $s_{13}$–$s_1$ and will never appear on the outside layer of the cable in any other location. Other strands will, of course, appear in arcs similar to the arc $s_{13}$–$s_1$, but angularly displaced therefrom. It becomes apparent then that cable made by the apparatus of this embodiment of my invention will not have each strand following the pattern of every other strand. It will be noted I have referred to the cable or cable unit 21 and the word "cable" as used in this specification will be understood to apply also to the structures that are commonly called cable units in commercial practice. A number of these units may be cabled together to make a large cable structure in such a way that certain strands in one of the units formed in the apparatus of FIGURES 8–16 will appear near the outside of the cable more than other strands in the same unit and create some capacitance unbalance. This consideration is not always significant or it may be overcome in the method of cabling the units together. However, the cable units made by the apparatus of FIGURES 1 and 5 will have each strand following the same pattern as every other strand in the unit.

*Operation*

The operation of my apparatus will be explained with particular reference to the stranding elements of FIGURES 8–16. Reels 12 of strands 13 are mounted in the rack 11 and the strands are gathered into the die 14. Each of the strands is then threaded through one of the pin guides 139. Unlike the embodiment of FIGURES 1 and 5, all the guides 139 may be used. If all the guides are not required for the number of strands being cabled I prefer to space the strands as evenly as possible around the chain 111. The strands are threaded from the element 18, which in this case corresponds to the unit 100, into the forming die 19, thence through the binding head 22.

The grouped strands are initially bound together by hand and attached to a tow line that pays them through the capstan 17. The guide 14 is preferably centered opposite the center of the sprocket 108. The apparatus is started by simultaneously starting the capstan 17 and the motor 138. Although it is possible, within the scope of my invention, to operate the capstan independently of the motor I prefer to have them interconnected, either electrically, in a known manner, or by driving the capstan 17 also from the motor 138. By this means the twist lay imparted to the strands may be given any desired value, by varying the ratio of capstan speed to the speed of the unit 100.

As the chain 111 moves in a clockwise direction and the sprocket 108 in a counterclockwise direction each of the strands of the cable passes through the position shown in FIGURE 16. The numerals show the consecutive positions of a given strand over equal intervals of time. It will be seen from FIGURE 16 that the strand passes around a distorted figure-8 and that it makes the counterclockwise circuit slowly and the clockwise circuit rapidly.

In each of the embodiments of my stranding apparatus each of the strands will be transferred from an outer layer to an inner layer in the total length of the cable. In addition my apparatus applies a false twist which renders the cable suitably flexible without requiring any additional cabling operation superimposed upon it. In this regard I prefer a gear and sprocket setting that will provide a twist lay of about 36 inches but this will be varied according to the cable diameter. It is noteworthy, however, that my apparatus is capable of providing so short a lay at speeds of 150 feet per minute and greater without causing tangles upstream of the unit 18. I believe this is to be possible because I have brought the strands together in the die 14 upstream of the stranding element 18, whereas when oscillating lay plates have been used to impart a false strand twist it had previously been thought necessary to first pass the strands through one or more guide plates.

In the embodiments of FIGURES 1 and 5 of my invention each of the strands follows the same path as every other strand in an equivalent time sequence, so that each strand in a long length of the completed cable has as much length close to the surface at any circumferential arc as every other strand. This, of course, results in a minimum degree of capacitance unbalance. Although each strand takes the same position along the length of the cable as every other strand it is a feature of cables made to my invention by following the figure-8 path, such as cables made on the apparatuses of FIGURES 1 and 5, that the proximity of the pairs to each other changes radically along the length of the cable. This, of course, greatly reduces the incidence of cross-talk. In FIGURE 18 I have shown a cross section of cable in which the conductors passed through the plate 24 while the chain 31 was confined to the upper loop. In FIGURE 19 I have shown a cross section of the same cable, a short distance removed, in which the conductors were passing through the plate 24 when the chain 31 had advanced so that the leading link was at the bottom of the outside "S" and the trailing link was at the top of the outside "S." The two configurations can be seen to be entirely different. In both FIGURES 18 and 19 the pair strands are numbered in the order of the strand guides they occupy in the chain.

I have invented a new and useful apparatus, cable, and method for which I desire an award of Letters Patent.

I claim:

1. A stranding apparatus comprising:
(A) means paying off a plurality of strands,
(B) means advancing said strands,
(C) means comprising a path in the form of a figure-8 transverse to the advance of said strands,
(D) means continuously urging said strands to move consecutively around said path,
(E) means downstream of said path gathering said strands to form a cable, and
(F) means downstream of said path binding said strands.

2. The apparatus of claim 1 wherein the total length of said path is at least twice the length of said path occupied at some instant by said strands moving around said path.

3. A stranding apparatus comprising:
(A) a sprocket having internal teeth,
(B) an endless chain having links fitting said teeth,
(C) a first member in the form of an open ring comprising
 (a) an outer periphery forming the arc of a circle,
 (b) an inner periphery, and
 (c) an entrance portion,
 (d) said member fitting within said sprocket and retaining said links on said teeth,
(D) said chain being of a length matching the combined inner and outer periphery of said member and being fitted around said combined periphery,
(E) a second member closely fitting said inner periphery and said entrance portion and retaining said links against said first member,
(F) said chain comprising a plurality of spaced strand-guiding means,
(G) means rotatably driving said second member thereby advancing said chain around said inner and outer periphery.

4. The apparatus of claim 3 wherein said second member rotates uniformly in one direction.

5. The apparatus of claim 3 comprising means rotatably driving said sprocket in a direction opposite to the direction of rotation of said second member.

6. The apparatus of claim 3 wherein said inner periphery comprises and irregular shape thereby increasing the length of chain fitted around it.

7. The apparatus of claim 4 wherein said inner periphery comprises and irregular shape thereby increasing the length of chain fitted around it.

8. The apparatus of claim 4 comprising means rotatably driving said sprocket uniformly in a direction opposite to the direction of rotation of said second member.

9. A stranding apparatus comprising:
(A) means paying off a plurality of strands,
(B) a chain comprising a plurality of strand guides,
(C) means continuously advancing said strands through said guides,
(D) a track in the form of a figure-8 transverse to the advance of said strands,
(E) means continuously urging said chain around said track,
(F) means downstream of said track gathering said strands to form a cable, and
(G) means downstream of said track binding said strands.

10. The apparatus of claim 9 wherein the length of said track is at least equal to twice the length of said chain.

11. The apparatus of claim 9 wherein said figure-8 comprises elongated loops, said loops being curved back toward the center of said figure-8.

12. The apparatus of claim 11 wherein the length of said track is at least equal to twice the length of said chain.

13. Apparatus advancing a plurality of strand guides in a path comprising a crossing double loop comprising:
(A) a plate,
(B) a wall defining two apertures in said plate, said apertures being connected by a narrow channel, said wall being straight in the proximity of said channel,
(C) a chain comprising said strand guides, said chain comprising a plurality of connected links,
(D) and means comprising a track around said wall,
(E) said links comprising first track engaging means on one side of said chain and second track engaging means on the opposite side of said chain,
(F) at least the first link of said chain having a length greater than the width of said channel,
(G) said first track engaging means of said first link engaging said track on one side of said channel and said second track engaging means of said first link simultaneously engaging said track on the other side of said channel, whereby said chain is directed around said track in a crossing double loop cross said channel.

14. A stranding apparatus comprising:
(A) a supporting plate,
(B) two substantially tangent discs rotatably mounted in the plane of said plate,
(C) a plurality of guide means on said discs for strands passing through said plate,
(D) means rotating said discs in opposite directions,
(E) means consecutively transferring said strands from one to the other of said discs in the area of tangency of said discs, whereby each of said strands is caused to follow a figure-8 path in the plane of said plate.

15. The method of stranding a reentrant cable with reversing lay comprising:
(A) paying a plurality of strands from individual stations spaced substantially apart,
(B) converging said strands through a central location,
(C) thence directly passing each of said strands through one of a plurality of guides,
(D) simultaneously advancing said guides consecutively through a figure-8 path transverse to the advance of said strands,
(E) thence directly converging said strands through a forming die, and
(F) binding said strands.

16. The method of claim 15 wherein said strands are positioned so as to leave a continuous length of said path, equal to at least half the total length of said path, free from said strands.

17. A telephone cable comprising:
(A) a plurality of pairs,
(B) any cross section of said cable having said pairs arranged in a continuous line formed by compressing a fractional length of a crossing double loop,
(C) lengthwise of said cable each of said pairs progressing continuously along said double loop,
(D) each of said pairs, in an indefinitely long length of said cable, having as much of its pair length in any cross-sectional area of said cable as any other of said pairs.

18. The cable of claim 17 wherein said fractional length is no longer than one half the full length of said double loop.

References Cited

UNITED STATES PATENTS

| | | | |
|---|---|---|---|
| 466,250 | 12/1891 | Marsh | 174—27 |
| 2,412,196 | 12/1946 | Ashbaugh et al. | 57—60 XR |
| 2,530,726 | 11/1950 | Rasmussen | 57—166 XR |
| 2,882,676 | 4/1959 | Bryan et al. | 57—166 XR |
| 3,060,976 | 10/1962 | Hinds | 57—59 XR |
| 3,099,703 | 7/1963 | Martin | 174—34 |
| 3,133,402 | 5/1964 | Zwolinski | 57—34 |
| 3,162,992 | 12/1964 | Davis et al. | 57—6 XR |
| 3,187,495 | 6/1965 | Christian | 57—34 |
| 3,253,397 | 5/1966 | Gillis | 57—34 |

FOREIGN PATENTS

| | | |
|---|---|---|
| 593,430 | 9/1957 | Italy. |

FRANK J. COHEN, *Primary Examiner.*

D. WATKINS, *Examiner.*